United States Patent
Tang et al.

(10) Patent No.: US 10,268,021 B2
(45) Date of Patent: Apr. 23, 2019

(54) CAMERA LENS

(71) Applicants: Han Tang, Shenzhen (CN); Hiroyuki Teraoka, Shenzhen (CN)

(72) Inventors: Han Tang, Shenzhen (CN); Hiroyuki Teraoka, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 35 days.

(21) Appl. No.: 15/416,880

(22) Filed: Jan. 26, 2017

(65) Prior Publication Data
US 2017/0363843 A1    Dec. 21, 2017

(30) Foreign Application Priority Data

Jun. 20, 2016 (JP) .................................. 2016-121673

(51) Int. Cl.
*G02B 9/62* (2006.01)
*G02B 13/00* (2006.01)

(52) U.S. Cl.
CPC ........... *G02B 13/0045* (2013.01); *G02B 9/62* (2013.01)

(58) Field of Classification Search
CPC . G02B 5/005; G02B 9/62; G02B 9/64; G02B 13/0045; G02B 13/001; G02B 27/0025
USPC .................................................. 359/642–830
See application file for complete search history.

(56) References Cited

U.S. PATENT DOCUMENTS

2016/0187619 A1\* 6/2016 Tang .................. G02B 13/0045
359/713

\* cited by examiner

*Primary Examiner* — Mahidere S Sahle
(74) *Attorney, Agent, or Firm* — Na Xu; IPro, PLLC

(57) ABSTRACT

A camera lens includes, arranged sequentially from an object side to an image side: a first lens with positive refractive power; a second lens with negative refractive power; a third lens with positive refractive power; fourth lens with negative refractive power; a fifth lens with positive refractive power; and a sixth lens with negative refractive power. The camera lens satisfies specific conditions.

2 Claims, 5 Drawing Sheets

CAMERA LENS

FIELD OF THE PRESENT DISCLOSURE

The present disclosure relates to the technical field of camera lens.

DESCRIPTION OF RELATED ART

The present invention relates to a camera lens. Particularly it relates to a camera lens very suitable for mobile phone camera module and WEB camera lens etc. equipped with high-pixel camera elements such as CCD, CMOS etc. According to the present invention, the camera lens is composed of six piece lenses with excellent optical properties: TTL (optical length)/IH (image height)≤1.45, ultra-thin, total angle of view (herein after referred to 2ω) is above 76°, wide angle, F value of high-luminous flux (herein after referred to Fno) Fno is lower than 1.85.

In recent years, various camera devices equipped with camera elements such as CCD, CMOS are extensively popular. Along with development on camera lens toward miniaturization and high performance, ultra-thin and high-luminous flux (Fno) wide angle camera lenses with excellent optical properties are needed in society.

The technology related to the camera lens composed of six piece ultra-thin and high-luminous flux (Fno) wide angle lenses with excellent optical properties is developed gradually. The camera lens mentioned in the proposal is composed of six piece lenses which are arranged sequentially from the object side as follows: a first lens with positive refractive power; a second lens with negative refractive power; a third lens with positive refractive power; a fourth lens with negative refractive power and a fifth lens with positive refractive power; a sixth lens with negative refractive power.

The camera lens disclosed in embodiments 4,7 of the prior Japanese Patent Publication No. 2015-194528 is composed of the above mentioned six piece lenses, but refractive power distribution of the first lens and the second lens is insufficient and shape of the first and fourth lens are improper; so Fno2.19 and 2.14 it it not sufficiently bright.

The camera lens disclosed in embodiment 3 of the prior Japanese Patent Publication No. 2015-079175 is composed of six lenses mentioned above, brightness Fno=1.85, but refractive power distribution of the first lens and the second lens is insufficient and shape of the first lens and the fourth lens are improper; so it is not sufficiently ultra-thin.

Therefore, an improved camera lens which can overcome the disadvantages mentioned above is desired.

BRIEF DESCRIPTION OF THE DRAWING

Many aspects of the exemplary embodiments can be better understood with reference to the following drawing. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figure and the embodiments. It should be understood the specific embodiments described hereby are only to explain the disclosure, not intended to limit the disclosure.

Figure 1:
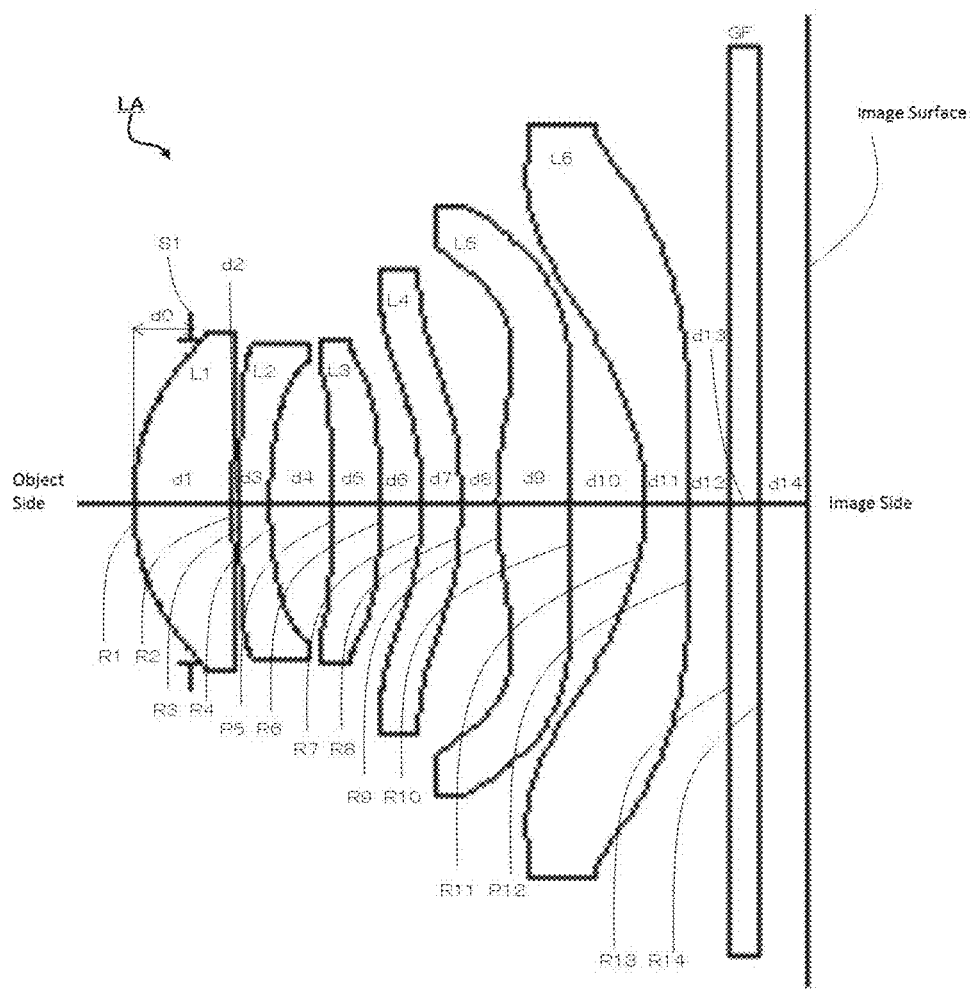
FIG. 1 is a structure diagram of a camera lens LA related to one embodiment of the invention.

FIG. 1 is the structure diagram of a camera lens LA related to one embodiment of the invention. The camera lens LA is composed of six piece lenses which are arranged sequentially from the object side to the imaging surface including a first lens L1, a second lens L2, a third lens L3, a fourth lens L4, a fifth lens L5 and a sixth lens L6. A glass plate GF is arranged between the sixth lens L6 and the imaging surface. And a glass cover or an optical filter having the function of filtering IR can be taken as the glass plate GF. Moreover, it shall be fine if no glass plate GF is arranged between the sixth lens L6 and the imaging surface.

The first lens L1 has positive refractive power; the second lens L2 has negative refractive power; the third lens L3 has negative refractive power; the fourth lens L4 has negative refractive power; the fifth lens has positive refractive power, the sixth lens has negative refractive power. Moreover, the surfaces of the six piece lenses should be designed as the aspheric shape preferably in order to correct the aberration well.

A camera lens is characterized in that the camera lens meets following condition (1)~(4):

$$0.80 \leq f1/f \leq 0.95 \quad (1)$$

$$-5.00 \leq f2/f \leq -2.00 \quad (2)$$

$$-1.80 \leq (R1+R2)/(R1-R2) \leq -1.30 \quad (3)$$

$$-5.00 \leq (R7+R8)/(R7-R8) \leq -2.50 \quad (4)$$

where,
f: overall focal distance of the camera lens
f1: focal distance of the first lens
f2: focal distance of the second lens
R1: curvature radius of the first lens' object side surface
R2: curvature radius of the first lens' image side surface
R7: curvature radius of the fourth lens' object side surface
R8: curvature radius of the fourth lens' image side surface.

The positive refractive power of the first lens L1 is specified in the condition (1). It is useful for development of ultra-thin trend when the numerical range exceeds the lower limit specified in the condition (1); however, the aberration cannot be corrected easily because the positive refractive power of the first lens L1 becomes too strong; on the contrary, when the numerical range exceeds the upper limit specified, the development of ultra-thin trend cannot be implemented easily because the refractive power of the first lens L1 becomes too weak Therefore, numerical range of condition (1) should be set within the numerical range of the following condition (1-A) preferably, $$0.85 \leq f1/f \leq 0.92 \quad (1\text{-A})$$

Negative refractive power of the second lens L2 is specified in the condition (2). Moreover, correction of chromatic aberration on axle and outside axle cannot be implemented easily outside the range of the condition (2).

Therefore, numerical range of condition (2) should be set within the numerical range of the following condition (2-A) preferably, $$-3.00 \leq f2/f \leq -2.10 \quad (2\text{-A})$$

The shape of the first lens L1 is specified in the condition (3). When it is outside the scope of condition (3), it is hard to meet Fno≤1.85.

Therefore, numerical range of condition (3) should be set within the numerical range of the following condition (3-A) preferably, $$-1.78 \leq (R1+R2)/(R1-R2) \leq -1.50 \quad (3\text{-A})$$

The shape of the fourth lens L4 is specified in the condition (4). When it is outside the scope of condition (4), it is hard to meet Fno≤1.85.

Therefore, numerical range of condition (4) should be set within the numerical range of the following condition (4-A) preferably, $$-4.10 \leq (R7+R8)/(R7-R8) \leq -3.00 \quad (4\text{-A})$$

The third lens L3 has positive refractive power and meets the following condition (5).

$$0.40 \leq (R5+R6)/(R5-R6) \leq 0.70 \quad (5)$$

where,
R5: curvature radius of the third lens' object side surface
R6: curvature radius of the third lens' image side surface The shape of the third lens L3 is specified in the condition (5). When it is outside the scope of condition (5), Fno≤1.85 can not be easily satisfied.

Therefore, numerical range of condition (5) should be set within the numerical range of the following condition (5-A) preferably, $$0.55 \leq (R5+R6)/(R5-R6) \leq 0.68 \quad (5\text{-A})$$

Because six piece lenses of the camera Lens LA all have the stated formation and meet all the conditions, so it is possible to produce a camera lens with excellent optical properties, TTL(optical length)/IH(image height)≤1.45, ultra-thin, wide angle 2ω≥78°, Fno≤1.85.

EMBODIMENTS

The camera lens LA of the invention shall be explained below by using the embodiments. Moreover, the symbols used in all embodiments are shown as follows. And mm shall be taken as the unit of the distance, the radius and the center thickness.
f: overall focal distance of the camera lens LA
f1: focal distance of the first lens L1
f2: focal distance of the second lens L2
f3: focal distance of the third lens L3
f4: focal distance of the fourth lens L4
f5: focal distance of the fifth lens L5
f6: focal distance of the sixth lens L6
Fno: F Value
2ω: total angle of view
S1: Open aperture
R: curvature radius of optical surface, if a lens is involved it is central curvature radius
R1: curvature radius of the first lens L1's object side surface
R2: curvature radius of the first lens L1's image side surface
R3: curvature radius of the second lens L2's object side surface
R4: curvature radius of the second lens L2's image side surface
R5: curvature radius of the third lens L3's object side surface
R6: curvature radius of the third lens L3's image side surface
R7: curvature radius of the fourth lens L4's object side surface
R8: curvature radius of the fourth lens L4's image side surface
R9: curvature radius of the fifth lens L5's object side surface
R10: curvature radius of the fifth lens L5's image side surface
R11: curvature radius of the sixth lens L6's object side surface
R12: curvature radius of the sixth lens L6's image side surface
R13: curvature radius of the glass plate GF's object side surface
R14: curvature radius of the glass plate GF's image side surface
d: center thickness of lenses or the distance between lenses
d0: axial distance from open aperture S1 to object side surface of the first lens L1
d1: center thickness of the first lens L1
d2: axial distance from image side surface of the first lens L1 to object side surface of the second lens L2
d3: center thickness of the second lens L2
d4: axial distance from image side surface of the second lens L2 to object side surface of the third lens L3
d5: center thickness of the third lens L3
d6: axial distance from image side surface of the third lens L3 to object side surface of the fourth lens L4
d7: center thickness of the fourth lens L4
d8: axial distance from image side surface of the fourth lens L4 to object side surface of the fifth lens L5
d9: center thickness of the fifth lens L5
d10: axial distance from image side surface of the fifth lens L5 to object side surface of the sixth lens L6
d11: center thickness of the sixth lens L6
d12: axial distance from image side surface of the sixth lens L6 to object side surface of the glass plate GF
d13: center thickness of glass plate GF
d14: axial distance from image side surface to imaging surface of the glass plate GF
nd: refractive power of line d
nd1: refractive power the first lens L1's line d
nd2: refractive power the second lens L2's line d
nd3: refractive power the third lens L3's line d
nd4: refractive power the fourth lens L4's line d
nd5: refractive power the fifth lens L5's line d
nd6: refractive power the sixth lens L6's line d
nd7: refractive power the glass plate GF's line d
vd: abbe number
v1: abbe number of the first lens L1
v2: abbe number of the second lens L2
v3: abbe number of the third lens L3
v4: abbe number of the fourth lens L4
v5: abbe number of the fifth lens L5
v6: abbe number of the sixth lens L6
v6: abbe number of the glass plate GF
TTL: optical length (axial distance from object side surface to the imaging surface of the first lens L1)

LB: axial distance (including thickness of the glass plate GF) from the image side surface to the imaging surface of the sixth lens L6;

$$y=(x2/R)/[1+\{1-(k+1)(x2/R2)\}^{1/2}]+A4x4+A6x6+A8x8+A10x10+A12x12+A14x14+A16x16 \quad (7)$$

in which, R is axial curvature radius, k is cone coefficient, A4, A6, A8, A10, A12, A14, A16 are aspheric coefficients.

For convenience sake, the aspheric surface shown in the formula (6) shall be taken as the aspheric surfaces of all lens' surfaces. However, the invention shall not be limited to polynomial form of the aspheric surface shown in the formula (6).

Embodiment 1

Figure 2:
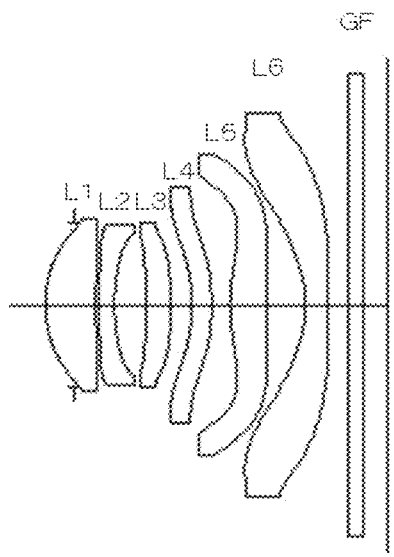
FIG. 2 is a structure diagram of the definite Embodiment 1 of the above-mentioned camera lens LA.

FIG. 2 is the structure of camera lens LA in Embodiment 1. Data shown in Table 1: curvature radius R of the object side surfaces and the image side surfaces, center thicknesses of the lenses, distances d among the lenses, refractive powers nd and abbe numbers of the lens L1~L6 in the Embodiment 1, wherein the camera lens LA is formed by the lens L1~L6; Data shown in Table 2: and the data including conical coefficients k and aspheric coefficients The values in embodiment 1 and 2 and the values corresponding to the parameters specified in the conditions (1)-(6) are shown in subsequent Table 5.

As shown on Table 5, the Embodiment 1 meets the conditions (1)~(5).

Figure 3:
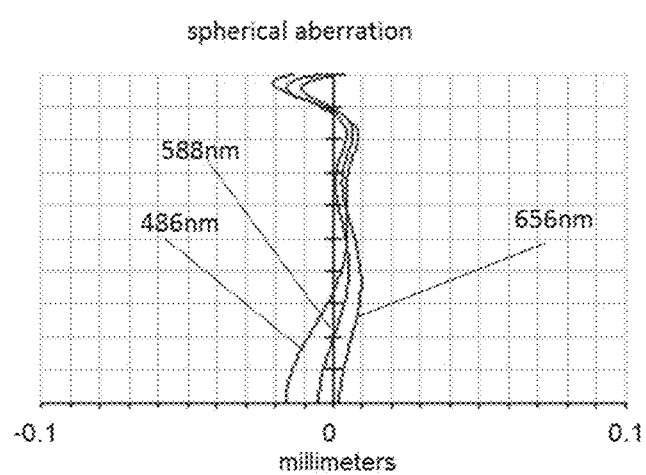
FIG. 3 is the spherical aberration diagram of the camera lens LA in Embodiment 1.
Figure 4:
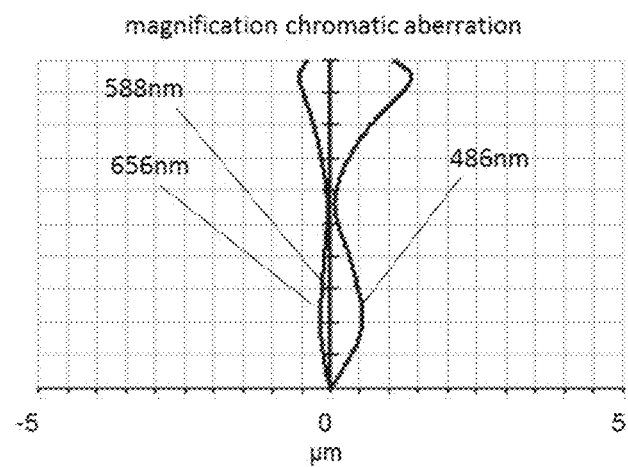
FIG. 4 is the magnification chromatic aberration diagram of the camera lens LA in Embodiment 1.
Figure 5:
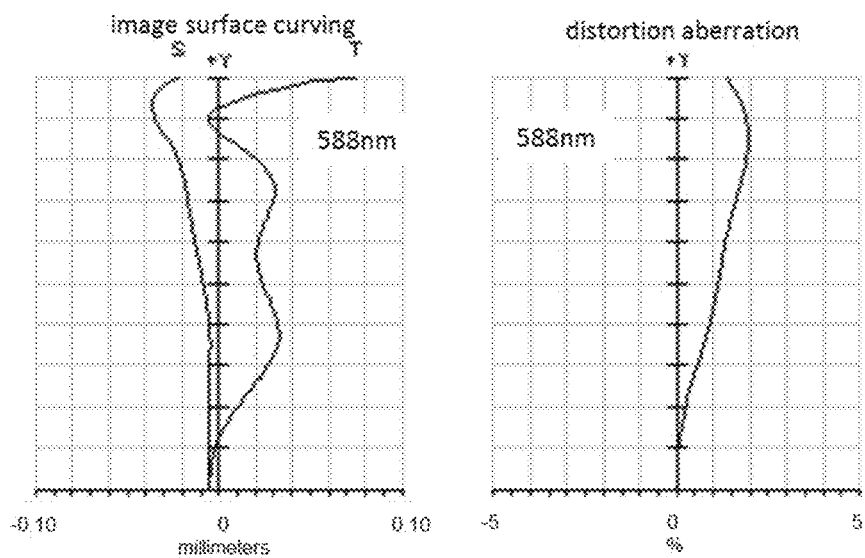
FIG. 5 is the image surface curving diagram and distortion aberration diagram of the camera lens LA in Embodiment 1.

Spherical aberration of camera lens LA in embodiment 1 is shown in FIG. 3, magnification chromatic aberration of the same is shown in FIG. 4, image surface curving and distortion aberration of the same is shown in FIG. 5. Furthermore, image surface curving S in FIG. 5 is the one opposite to the sagittal image surface, T is the one opposite to the tangent image surface. Same applies for the Embodiment 2. As show in FIG. 3~5, the camera lens in embodiment 1 has the properties as follows: $2\omega=79.3°$, TTL/IH=1.387, Fno=1.80, and camera lens is ultra-thin, high-luminous flux wide angle camera lens, it is not difficult to understand why it has excellent optical properties.

Embodiment 2

Figure 6:
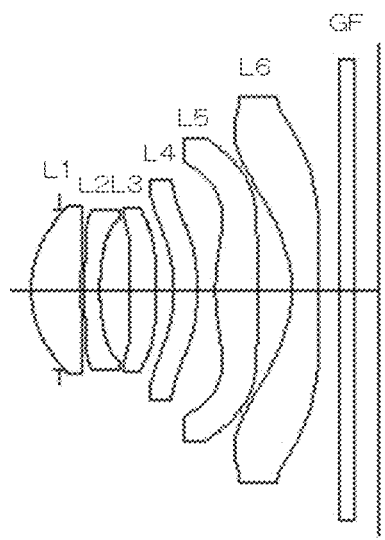
FIG. 6 is the structure diagram of the definite Embodiment 2 of the above-mentioned camera lens LA.

FIG. 6 is the structure of camera lens LA in Embodiment 2. Data shown in Table 3: curvature radius R of the object side surfaces and the image side surfaces, center thicknesses of the lenses, distances d among the lenses, refractive powers nd and abbe numbers of the lens L1~L6 in the Embodiment 2, wherein the camera lens LA is formed by the lens L1~L6; Data shown in Table 4: and the data including conical coefficients k and aspheric coefficients

TABLE 1

|  | R | d |  | nd |  | v d |
|---|---|---|---|---|---|---|
| S1 | ∞ | d0= | −0.400 |  |  |  |
| R1 | 1.58525 | d1= | 0.714 | nd1 | 1.5441 | v 1 | 56.12 |
| R2 | 6.16937 | d2= | 0.050 |  |  |  |
| R3 | 6.33571 | d3= | 0.220 | nd2 | 1.6422 | v 2 | 22.41 |
| R4 | 3.01101 | d4= | 0.434 |  |  |  |
| R5 | 24.51127 | d5= | 0.360 | nd3 | 1.5441 | v 3 | 56.12 |
| R6 | −6.88364 | d6= | 0.301 |  |  |  |
| R7 | −2.54482 | d7= | 0.279 | nd4 | 1.6422 | v 4 | 22.41 |
| R8 | −4.75780 | d8= | 0.264 |  |  |  |
| R9 | 2.32903 | d9= | 0.529 | nd5 | 1.5441 | v 5 | 56.12 |
| R10 | −17.55044 | d10= | 0.540 |  |  |  |
| R11 | −1.74180 | d11= | 0.306 | nd6 | 1.5352 | v 6 | 56.12 |
| R12 | 43.74767 | d12= | 0.300 |  |  |  |
| R13 | ∞ | d13= | 0.210 | nd7 | 1.5168 | v 7 | 64.17 |
| R14 | ∞ | d14= | 0.346 |  |  |  |

TABLE 3

|  | R | d |  | nd |  | v d |
|---|---|---|---|---|---|---|
| S1 | ∞ | d0= | −0.400 |  |  |  |
| R1 | 1.58044 | d1= | 0.702 | nd1 | 1.5441 | v 1 | 56.12 |
| R2 | 6.39508 | d2= | 0.050 |  |  |  |
| R3 | 6.42257 | d3= | 0.219 | nd2 | 1.6422 | v 2 | 22.41 |
| R4 | 3.02046 | d4= | 0.426 |  |  |  |
| R5 | 25.18250 | d5= | 0.375 | nd3 | 1.5441 | v 3 | 56.12 |
| R6 | −6.90545 | d6= | 0.248 |  |  |  |
| R7 | −2.25082 | d7= | 0.332 | nd4 | 1.6422 | v 4 | 22.41 |

TABLE 2

| | Cone coefficiente | Aspheric coefficient | | | | | | |
|---|---|---|---|---|---|---|---|---|
|  | k | A4 | A6 | A8 | A10 | A12 | A14 | A16 |
| R1 | −2.1455E−01 | 8.3503E−03 | 6.0744E−03 | −8.0038E−03 | 1.9014E−02 | −2.7868E−02 | 1.9182E−02 | −6.2430E−03 |
| R2 | 2.4670E+01 | −1.7607E−01 | 1.7757E−01 | −5.1151E−02 | −7.0192E−02 | 3.1599E−02 | 2.4274E−02 | −1.5559E−02 |
| R3 | 2.8408E+01 | −2.1613E−01 | 2.8722E−01 | −1.2382E−01 | −5.8423E−02 | 3.6853E−02 | 4.8042E−02 | −3.0379E−02 |
| R4 | 6.8161E+00 | −7.6161E−02 | 1.3510E−01 | −7.4983E−02 | 3.8499E−02 | −1.0154E−01 | 1.4700E−01 | −5.6176E−02 |
| R5 | 4.1966E+02 | −7.9058E−02 | −3.1801E−02 | −4.5990E−03 | −2.7818E−02 | 7.3020E−02 | −1.1245E−01 | 7.6685E−02 |
| R6 | −1.3059E+02 | −8.2192E−02 | −4.3366E−02 | 1.2463E−02 | 1.9895E−02 | −4.4998E−02 | 2.7709E−02 | 1.6502E−03 |
| R7 | −2.2878E+01 | −1.6907E−01 | 1.1558E−01 | −2.6040E−02 | 6.7087E−02 | 7.1453E−02 | −4.9690E−03 | 9.3575E−04 |
| R8 | −1.6113E+00 | −1.6713E−01 | 1.0109E−01 | −3.1295E−03 | −5.4408E−03 | −6.9490E−04 | 5.0881E−04 | −4.4648E−05 |
| R9 | −1.0288E+01 | −6.0953E−02 | 9.4161E−03 | −5.0719E−03 | −2.5008E−03 | 2.0924E−03 | −6.6527E−04 | 8.6568E−05 |
| R10 | 6.6224E+01 | 6.1742E−02 | −5.5857E−02 | 1.7620E−02 | −3.8833E−03 | 5.6805E−04 | −5.1666E−05 | 2.7693E−06 |
| R11 | −1.4694E+00 | 3.1131E−02 | −2.6205E−02 | 1.1821E−02 | −2.4616E−03 | 2.7338E−04 | −1.5871E−05 | 3.8058E−07 |
| R12 | −3.0200E+01 | −1.4035E−02 | −1.0831E−02 | 5.5909E−03 | −1.2883E−03 | 1.5771E−04 | −1.0157E−05 | 2.9793E−07 |

TABLE 3-continued

|  | R | d |  | nd |  | v d |
|---|---|---|---|---|---|---|
| R8 | −3.85864 | d8= | 0.254 |  |  |  |
| R9 | 2.31802 | d9= | 0.599 | nd5 | 1.5441 | v 5 56.12 |
| R10 | −17.67552 | d10= | 0.490 |  |  |  |
| R11 | −1.82490 | d11= | 0.379 | nd6 | 1.5352 | v 6 56.12 |
| R12 | 32.95541 | d12= | 0.300 |  |  |  |
| R13 | ∞ | d13= | 0.210 | nd7 | 1.5168 | v 7 64.17 |
| R14 | ∞ | d14= | 0.350 |  |  |  |

TABLE 4

| | Cone coefficiente | Aspheric coefficient | | | | | | |
|---|---|---|---|---|---|---|---|---|
| | k | A4 | A6 | A8 | A10 | A12 | A14 | A16 |
| R1 | −2.1675E−01 | 6.5808E−03 | 5.6984E−03 | −7.9310E−03 | 1.9015E−02 | −2.7949E−02 | 1.9064E−02 | −6.3693E−03 |
| R2 | 2.5307E+01 | −1.7435E−01 | 1.7781E−01 | −5.1145E−02 | −7.0122E−02 | 3.1714E−02 | 2.4405E−02 | −1.5429E−02 |
| R3 | 2.8393E+01 | −2.1138E−01 | 2.8849E−01 | −1.2285E−01 | −5.7882E−02 | 3.7098E−02 | 4.8152E−02 | −3.0313E−02 |
| R4 | 6.6990E+00 | −7.9621E−02 | 1.4634E−01 | −7.4459E−02 | 3.6351E−02 | −1.0173E−01 | 1.4926E−01 | −5.2720E−02 |
| R5 | 4.9869E+02 | −7.1793E−02 | −3.3781E−02 | −6.6319E−03 | −2.8596E−02 | 7.3166E−02 | −1.1182E−01 | 7.7847E−02 |
| R6 | −1.4561E+02 | −7.8409E−02 | −4.1472E−02 | 1.2697E−02 | 1.9457E−02 | −4.5572E−02 | 2.7284E−02 | 1.5347E−03 |
| R7 | −1.6148E+01 | −1.6914E−01 | 1.1613E−01 | −2.5820E−02 | 7.2149E−04 | 7.1274E−03 | −5.0200E−03 | 8.6725E−04 |
| R8 | −1.7575E+00 | −1.6709E−01 | 1.0054E−01 | −3.3097E−03 | −5.4978E−03 | −7.1449E−03 | 5.0190E−04 | −4.6892E−05 |
| R9 | −1.2180E+01 | −6.1785E−02 | 9.6877E−03 | −4.9887E−03 | −2.4857E−03 | 2.0946E−03 | −6.6474E−04 | 8.6771E−05 |
| R10 | 6.5653E+01 | 5.8368E−02 | −5.4758E−02 | 1.7706E−02 | −3.8777E−03 | 5.6822E−04 | −5.1754E−05 | 2.7277E−06 |
| R11 | −1.4589E+00 | 3.1088E−02 | −2.6201E−02 | 1.1823E−02 | −2.4612E−03 | 2.7344E−04 | −1.5860E−05 | 3.8241E−07 |
| R12 | 6.5016E+01 | −1.3766E−02 | −1.0802E−02 | 5.5935E−03 | −1.2881E−03 | 1.5771E−04 | −1.0158E−05 | 2.9747E−07 |

As shown on Table 5, the Embodiment 2 meets the conditions (1)~(5).

Figure 7:
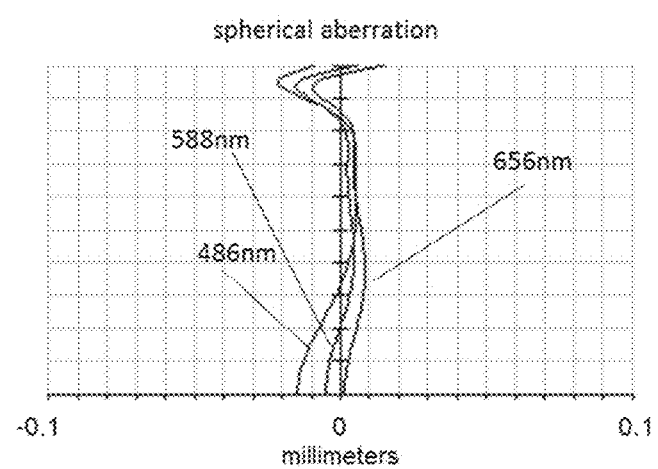
FIG. 7 is the spherical aberration diagram of the camera lens LA in Embodiment 2.
Figure 8:
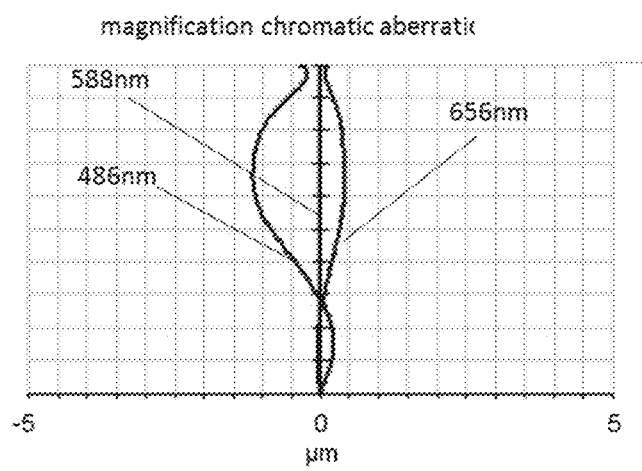
FIG. 8 is the magnification chromatic aberration diagram of the camera lens LA in Embodiment 2.
Figure 9:
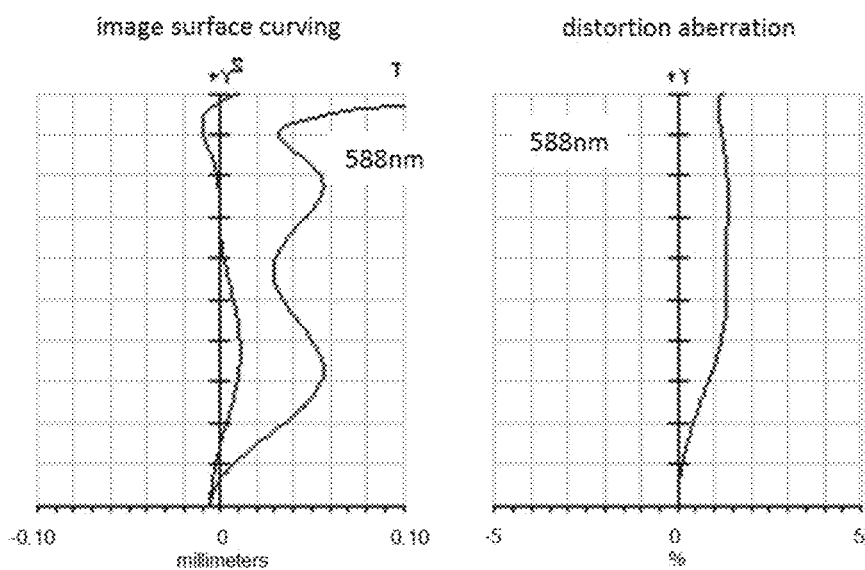
FIG. 9 is the image surface curving diagram and distortion aberration diagram of the camera lens LA in Embodiment 2.

Spherical aberration of camera lens LA in embodiment 2 is shown in FIG. 7, magnification chromatic aberration of the same is shown in FIG. 8, image surface curving and distortion aberration of the same is shown in FIG. 9. As show in FIG. 7~9, the camera lens LA in embodiment 2 has the properties as follows: $2\omega=79.7°$, TTL/IH=1.410, Fno=1.80, and camera lens is ultra-thin, high-luminous flux wide angle camera lens, it is not difficult to understand why it has excellent optical properties.

The values in all embodiments and the values corresponding to the parameters specified in the conditions (1)~(5) are shown in the Table 5. Furthermore, unit of various values in Table 5 is respectively $2\omega(°)$, f(mm), f1 (mm), f2 (mm), f3 (mm), f4 (mm), f5 (mm), f6 (mm), TTL(mm), LB (mm), IH(mm).

TABLE 5

|  | Embodiment 1 | Embodiment 2 | Condition |
|---|---|---|---|
| f1/f | 0.891 | 0.886 | 1 |
| f2/f | −2.200 | −2.199 | 2 |
| (R1 + R2)/(R1 − R2) | −1.692 | −1.657 | 3 |
| (R7 + R8)/(R7 − R8) | −3.300 | −3.800 | 4 |
| (R5 + R6)/(R5 − R6) | 0.561 | 0.570 | 5 |
| Fno | 1.80 | 1.80 |  |
| 2ω | 79.3 | 79.7 |  |
| TTL/IH | 1.387 | 1.410 |  |
| f | 4.170 | 4.142 |  |
| f1 | 3.717 | 3.670 |  |
| f2 | −9.173 | −9.109 |  |
| f3 | 9.918 | 10.002 |  |
| f4 | −8.962 | −9.151 |  |
| f5 | 3.815 | 3.807 |  |
| f6 | −3.123 | −3.219 |  |
| TTL | 4.853 | 4.934 |  |
| LB | 0.856 | 0.860 |  |
| IH | 3.500 | 3.500 |  |

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A camera lens comprising, arranged sequentially from an object side to an image side:

a first lens with positive refractive power; a second lens with negative refractive power; a third lens with positive refractive power; a fourth lens with negative refractive power;

a fifth lens with positive refractive power; the fifth lens element has an image-side surface being convex in the paraxial region thereof;

and a sixth lens with negative refractive power; wherein, the camera lens satisfies the following conditions (1)~(4):

$$0.80 \leq f1/f \leq 0.95 \quad (1)$$

$$-5.00 \leq f2/f \leq -2.00 \quad (2)$$

$$-1.80 \leq (R1+R2)/(R1-R2) \leq -1.30 \quad (3)$$

$$-5.00 \leq (R7+R8)/(R7-R8) \leq -2.50 \quad (4)$$

where, f: overall focal distance of the camera lens; f1: focal distance of the first lens; f2: focal distance of the second lens; R1: curvature radius of the first lens' object side surface; R2: curvature radius of the first lens' image side surface; R7: curvature radius of the fourth lens' object side surface; R8: curvature radius of the fourth lens' image side surface.

2. The camera lens as described in claim 1 further satisfying the following condition (5):

$$0.40 \leq (R5+R6)/(R5-R6) \leq 0.70 \quad (5)$$

where,

R5: curvature radius of the third lens' object side surface; R6: curvature radius of the third lens' image side surface.

* * * * *